(12) United States Patent  
Hsu et al.

(10) Patent No.: US 8,110,278 B2  
(45) Date of Patent: *Feb. 7, 2012

(54) SCRATCH-RESISTANT OPTICAL FILM HAVING ORGANIC PARTICLES WITH HIGHLY UNIFORM PARTICLE SIZE

(75) Inventors: Lung-Lin Hsu, Kaohsiung (TW); Shu-Hong Liu, Kaohsiung (TW); Chun-Hung Chou, Kaohsiung (TW)

(73) Assignee: Eternal Chemical Co., Ltd., Kaohsiung (TW)

( * ) Notice: Subject to any disclaimer, the term of this patent is extended or adjusted under 35 U.S.C. 154(b) by 621 days.

This patent is subject to a terminal disclaimer.

(21) Appl. No.: 12/157,746

(22) Filed: Jun. 12, 2008

(65) Prior Publication Data

US 2008/0311351 A1 Dec. 18, 2008

(30) Foreign Application Priority Data

Jun. 12, 2007 (TW) .............................. 96121300 A

(51) Int. Cl.
*G02B 5/02* (2006.01)
*G02B 27/00* (2006.01)

(52) U.S. Cl. ........ 428/143; 428/141; 428/142; 428/147; 359/577; 359/599; 359/601; 359/615

(58) Field of Classification Search .......... 428/1.1–1.62, 428/141–149, 304.4–339; 359/229, 298–324, 359/483–502, 577–591
See application file for complete search history.

(56) References Cited

U.S. PATENT DOCUMENTS

| | | | | |
|---|---|---|---|---|
| 6,166,855 A * | 12/2000 | Ikeyama et al. | ............. | 359/580 |
| 6,503,627 B1 * | 1/2003 | Niimi et al. | ................. | 428/409 |
| 6,743,488 B2 * | 6/2004 | Memarian et al. | ............ | 428/1.4 |
| 7,833,622 B2 * | 11/2010 | Hsu et al. | .................... | 428/327 |
| 2005/0106377 A1 * | 5/2005 | Koestner et al. | ........... | 428/304.4 |
| 2006/0132922 A1 * | 6/2006 | Takao et al. | .................. | 359/601 |
| 2008/0305301 A1 * | 12/2008 | Hsu et al. | .................... | 428/147 |

* cited by examiner

*Primary Examiner* — David Sample
*Assistant Examiner* — Nancy Rosenberg
(74) *Attorney, Agent, or Firm* — Ladas & Parry LLP

(57) ABSTRACT

The subject invention relates to a scratch-resistant optical film, which comprises:
(a) a transparent substrate having a first surface and a second surface;
(b) a diffusion layer on the first surface of the substrate, which has a convex-concave structure and is comprised of a first hard coat layer comprising organic particles;
(c) a scratch-resistant layer on the second surface of the substrate, which is comprised of a second hard coat layer;
wherein the organic particles in the first hard coat layer are formed from a polyacrylate resin which comprises at least one multi-functional acrylate monomer as polymerization units, said multi-functional acrylate monomer being in an amount from 30 to 70 wt % based on the total weight of the monomer used, and wherein the organic particles have a single mean particle size and have a particle size distribution in the range within about ±5% of the mean particle size.

29 Claims, 2 Drawing Sheets

SCRATCH-RESISTANT OPTICAL FILM HAVING ORGANIC PARTICLES WITH HIGHLY UNIFORM PARTICLE SIZE

BACKGROUND OF THE INVENTION

1. Field of the Invention

The present invention relates to an optical film. In particular, the present invention relates to a diffusion film applicable to a backlight module.

2. Description of the Prior Art

Since a liquid crystal panel cannot emit light by itself, a backlight module acting as a light source is an important element for the displaying function of a LCD and is extremely important for enhancing the luminance of the LCD. Currently, it has become the most economic and convenient solution to employ various optical films in the backlight module to enhance the brightness of LCD panels to optimize the use efficiency of the light source to be applied most efficiently, without altering any element design or consuming additional energy. FIG. 1 is a simplified schematic illustration of the backlight module comprising various optical films. As shown in FIG. 1, the optical films contained in a typical backlight module include a reflective film (1) positioned on the lower side of a light guide (2); and other optical films positioned on the upper side of the light guide (2), which include from the bottom to the top a lower diffusion film (3), brightness enhancing films (4) and (5), and a protective diffusion film (6) in sequence.

The main function of the brightness enhancing film involves gathering the scattered light rays emitted from the light guide in all directions by refraction and internal total reflection and converging the light rays in the on-axis direction of about ±35 degrees to enhance the luminance of the LCD. The brightness enhancing film achieves the effect of gathering light by means of regular or irregular prismatic microstructures. However, if the prismatic structures are contacted with the panel, scratching tends to occur, thus affecting the optical properties. Presently, there are no other solutions in the industry but using a protective diffusion film (which is also referred to as an "upper diffusion film") to prevent the impairment between the brightness enhancing film and the panel caused by the vibration during transportation.

Moreover, the functions of the protective diffusion film also include scattering light passing through the brightness enhancing film to obtain a uniform luminance, eliminating the pattern of the brightness enhancing film and protecting the brightness enhancing film. The operating principle of the protective diffusion film is to make light pass through two media with different refractive indexes, and thus the light will be refracted, reflected and scattered to achieve the effect of optics diffusion. Conventionally, the protective diffusion film includes two types, i.e., the inner-diffusion type and the surface-diffusion type. The inner-diffusion type is consisting of polycarbonate (PC), polystyrene or polymethyl methacrylate (PMMA) resins with organic or inorganic particles. By the utilization of diffusion particles, the light will be refracted and scattered because it passed through two media with different refractive indexes, so that the linear light emitted from the light source can be diffused into a uniform surface light. That is, the light from a below light source is scattered by the diffusion film, uniformly dispersed upward, and then emitted. The surface-diffusion type reflects and refracts light by roughening the surface of a transparent resin plate. However, the surface-diffusion type is time-consuming and complicated in preparation procedure and is relative expensive in cost.

It is known in the art that the inner-diffusion type of protective diffusion films usually utilize diffusion particles with a wide particle size distribution and different particle sizes. That is, the particle size distribution of the diffusion particles (y represents the quantity of particles, while x represents the particle size) is a wide single-peak distribution. For example, when the particles used have a mean particle size of about 15 μm, the particle size distribution of the particles generally ranges from about 1 μm to about 30 μm. It is also known in the art that a mixture of more than two groups of particles with different mean particle sizes can be used as diffusion particles. That is, the particle size distribution of the diffusion particles (y represents the quantity of particles, while x represents the particle size) is a two (multi)-peak distribution. Although the light diffusion effect can be improved by using diffusion particles having a wide single-peak particle size distribution or a two (multi)-peak particle size distribution, the light will be scattered randomly due to the different particle sizes of the particles, and as a result, the light source cannot be efficiently utilized.

It is known that, if the diffusion particles in the diffusion film are aggregated or adhered to each other, not only is the light diffusion uniformity affected, but dark spots are also likely to be generated on the surface of the display. In order to solve the above problems, U.S. Pat. No. 7,218,450 B2 discloses using one or more organic or inorganic particles with a single distribution as diffusion particles with certain parameters, including the lamination ratio, particle size of the flocculated particles, and when two kinds of particles with a single distribution are used, the mean particle sizes of the two kinds of particles with a single distribution, that meet special formulae. 95% of the particles with a single distribution used in U.S. Pat. No. 7,218,450 B2 have a particle size ranging within ±15% of the mean particle size. U.S. Pat. No. 7,218,450 B2 further teaches using diffusion particles having a narrow particle size distribution, but is silent on the crosslinking degree of the diffusion particles. In fact, an insufficient crosslinking degree of the diffusion particles will inevitably cause some problems. For example, particles with a low crosslinking degree are likely to interact with the solvent in the binder and thus swell up. Therefore, compared with the particles with a high crosslinking degree, the particles with a low crosslinking degree will have a low solvent resistance. Furthermore, as the volume of the particles with a low crosslinking degree is changed because the solvent is absorbed, the optical properties of the particles become unstable, and the viscosity on the surfaces of the particles increases, so that the particles are easily aggregated with each other, thereby further affecting the coating processability and light diffusion effects of the diffusion film.

Therefore, in current technology, although the diffusion efficiency of protective diffusion films meet current demands, their luminance is not sufficient for the application in LCDs. Consequently, for current technology, it is necessary to further enhance the luminance of protective diffusion films, thereby increasing the whole brightness of LCDs.

SUMMARY OF THE INVENTION

The present invention provides a scratch-resistant optical film to avoid the impairment between other optical films and a panel caused by the vibration during transportation.

The present invention also provides a scratch-resistant optical film containing organic particles with a highly uniform particle size, which comprises organic particles having a uniform particle size to avoid the waste of light source caused by the utilization of organic particles with various particle sizes, so as to effectively improve the luminance of the optical film.

The present invention further provides a scratch-resistant optical film containing highly crosslinked organic particles that are solvent resistant and can prevent the organic particles from swelling up, resulting in the unstability of the optical properties of the film. Meanwhile, by increasing the crosslinking degree of the organic particles, the hardness of the organic particles is enhanced, so as to enhance their scratch resistance and wear resistance.

In order to achieve the above objectives, the present invention provides a scratch-resistant optical film, which comprises: (a) a transparent substrate having a first surface and a second surface; (b) a diffusion layer on the first surface of the substrate, which has a convex-concave structure and is comprised of a first hard coat layer comprising organic particles; (c) a scratch-resistant layer on the second surface of the substrate, which has a smooth surface and is comprised of a second hard coat layer; wherein the organic particles in the first hard coat layer are formed from a polyacrylate resin which comprises at least one mono-functional acrylate monomer and at least one multi-functional acrylate monomer as the polymerization units, wherein said multi-functional acrylate monomer is in an amount from 30 to 70 wt % based on the total weight of the monomer used, and wherein the organic particles have a single mean particle size and have a particle size distribution in the range within about ±5% of the mean particle size.

DETAILED DESCRIPTION OF THE INVENTION

The scratch-resistant optical film of the present invention is illustrated below in detail by the embodiments with reference to the drawings.

Figure 1:
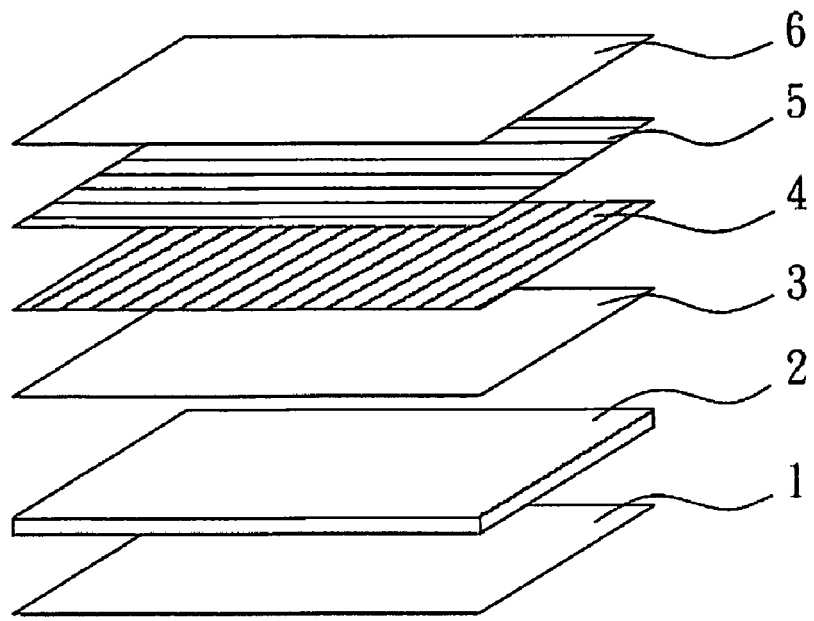
FIG. 1 is a simplified schematic view of a backlight module comprising various optical films.
Figure 2:
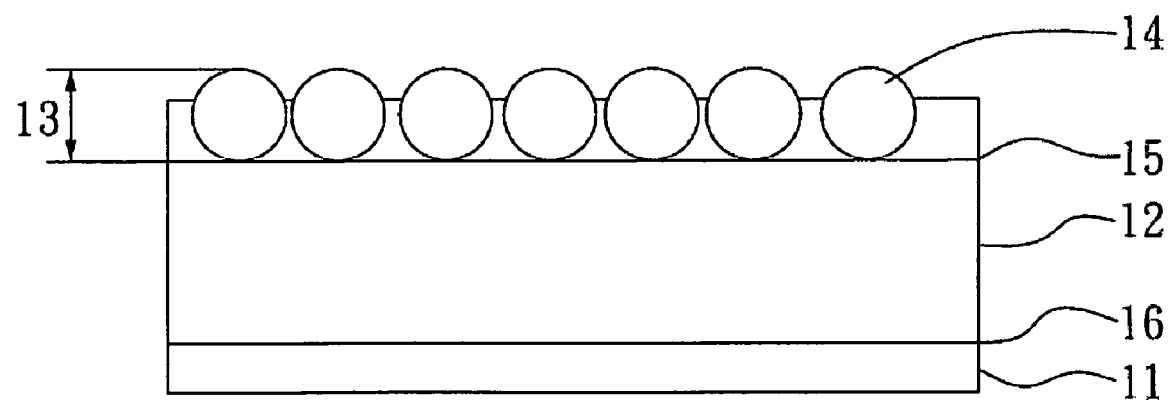
FIG. 2 is a schematic view of an embodiment of the scratch-resistant optical film according to the present invention.

FIG. 2 shows an embodiment of the scratch-resistant optical film of the present invention. As shown in FIG. 2, the scratch-resistant optical film of the present invention includes a substrate 12 having a first surface 15 and a second surface 16, where on the first surface 15 of the substrate 12 is there a diffusion layer 13 having a convex-concave structure, the diffusion layer containing organic particles 14; and on the second surface 16 of the substrate is there a scratch-resistant layer 11 having a smooth surface.

The substrate 12 used in the scratch-resistant optical film of the present invention can be any substrate known to persons having ordinary skill in the art, such as glass or plastic. The plastic substrate is not particularly limited and can be any one known to persons having ordinary skill in the art, which includes, for example, but is not limited to, polyester resins, such as polyethylene terephthalate (PET) and polyethylene naphthalate (PEN); polyacrylate resins, such as polymethyl methacrylate (PMMA); polyimide resins; polystyrene resins; polycycloolefin resins; polyolefin resins; polycarbonate resins; polyurethane resins; triacetate cellulose (TAC); or a mixture thereof. The preferred substrates are those formed from polyethylene terephthalate, polymethyl methacrylate, polycycloolefin resin, or triacetate cellulose, or a mixture thereof. More preferably, the substrate is polyethylene terephthalate. The thickness of the first optical layer is preferably in the range from 16 μm to 250 μm, usually depending on the desired purpose of an optical product.

When a plastic substrate is used, a hard coat layer can be formed on a surface of the plastic substrate to enhance the hardness and avoid the scratch of the surface of the substrate, thereby achieving a scratch-resistant effect. Moreover, in order to solve the warp problem caused by an uneven stress during curing, the subject invention uses and treats hard coat solutions in a manner of dual curing with both heat and UV radiation, thereby forming a first hard coat layer and a second hard coat layer on the first surface 15 and the second surface 16 of the substrate 12. According to the invention, the hard coat solutions used for forming the first and second hard coat layers can be the same or different, and contain an anti-static agent, a UV curable resin, and a resin selected from the group consisting of a thermal setting resin and a thermal plastic resin and a mixture thereof. Preferably, said hard coat solutions contain an anti-static agent, a UV curable resin, and a thermal setting resin. By the high strength and good toughness of the thermal setting resin, the resultant hard coat layers can have an excellent heat resistance and extremely low volume shrinkage.

The anti-static agent suitable for the present invention is not particularly limited, and can be any anti-static agent well known to persons having ordinary skill in the art, such as ethoxy glycerin fatty acid esters, quaternary amine compounds, aliphatic amine derivatives, epoxy resins (such as polyethylene oxide), siloxane, or other alcohol derivatives, such as poly(ethylene glycol) ester, poly(ethylene glycol) ether and the like.

The UV curable resin useful in the hard coat solutions according to the invention comprises at least one acrylic or acrylate monomer having one or more functional groups, of which the acrylate monomers are preferred. The acrylate monomers useful in the invention include, for example, but are not limited to, methacrylate monomers, acrylate monomers, urethane acrylate monomers, polyester acrylate monomers, or epoxy acrylate monomers, among which (meth) acrylate monomers are preferred.

For example, the (meth)acrylate monomers useful in the invention are selected from the group consisting of methyl methacrylate, butyl methacrylate, 2-phenoxy ethyl acrylate, ethoxylated 2-phenoxy ethyl acrylate, 2-(2-ethoxyethoxy) ethyl acrylate, cyclic trimethylolpropane formal acrylate, β-carboxyethyl acrylate, lauryl methacrylate, isooctyl acrylate, stearyl methacrylate, isodecyl acrylate, isobornyl methacrylate, benzyl acrylate, hydroxypivalyl hydroxypivalate diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate, diethylene glycol dimethacrylate, 2-hydroxyethyl methacrylate phosphate, tris(2-hydroxyethyl)isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, di-trimethylolpropane tetraacrylate, propoxylated pentaerythritol tetraacrylate, pentaerythritol tetraacrylate, dipentaerythritol hexaacrylate, methacrylate, hydroxyethyl acrylate (HEA), 2-hydroxyethyl methacrylate (HEMA), tripropylene glycol dimethacrylate, 1,4-butanediol dimethacrylate, 1,6-hexanediol dimethacrylate, allylated cyclohexyl dimethacrylate, isocyanurate dimethacrylate, ethoxylated trimethylol propane trimethacrylate, propoxylated glycerol trimethacrylate, trimethylol propane trimethacrylate, and tris(acryloxyethyl)isocyanurate, and a mixture thereof. Preferably, the acrylate monomers include dipentaerythritol hexaacrylate, trimethylol propane trimethacrylate, and pentaerythritol triacrylate.

To enhance the film formation of the hard coat solutions, the UV curable resin according to the invention may optionally comprise an oligomer with a molecular weight in the range from $10^3$ to $10^4$. This kind of oligomer is well known to persons skilled in the art, for example, acrylate oligomers, which include, for example, but are not limited to, urethane acrylates, such as aliphatic urethane acrylates, aliphatic urethane hexaacrylates, and aromatic urethane hexaacrylates; epoxy acrylates, such as bisphenol-A epoxy diacrylate and novolac epoxy acrylate; polyester acrylates, such as polyester diacrylate; or homo-acrylates.

The mean molecular weight of the thermal setting resin useful in the hard coat solutions according to the invention is typically in the range from $10^4$ to $2\times10^6$, preferably from $2\times10^4$ to $3\times10^5$, more preferably from $4\times10^4$ to $10^5$. The thermal setting resin according to the invention can be selected from the group consisting of hydroxyl (—OH) and/or carboxy (—COOH) group-containing polyester resins, epoxy resins, polyacrylate resins, polymethacrylate resins, polyamide resin, fluoro resins, polyimide resins, polyurethane resins, and alkyd resins, and a mixture thereof, of which the polymethacrylate resins or polyacrylate resins containing a hydroxyl (—OH) and/or carboxy (—COOH) group is preferred, such as a polymethacrylic polyol resin.

The thermal plastic resin that can be used in the present invention is selected from the group consisting of polyester resins; polymethacrylate resins, such as polymethyl methacrylate (PMMA); and a mixture thereof.

According to the present invention, the hard coat solutions for forming the first and second hard coat layers may optionally contain any additives known to persons having ordinary skill in the art, which include, but are not limited to, a curing agent, a photoinitiator, a fluorescent whitening agent, a UV absorber, a leveling agent, a wetting agent, a dispersant, a stabilizer, or inorganic particulates.

The curing agent suitable for the present invention can be any curing agent well known to persons having ordinary skill in the art and capable of making the molecules to be chemically bonded with each other to form crosslinking, and can be, for example, but is not limited to, diisocyanate or polyisocyanate.

The photoinitiators used for the invention are those that generate free radicals upon photoirradiation to induce polymerization through the transfer of free radicals. The photoinitiators useful in the invention are not particularly restricted, and include, for example, but are not limited to, benzophenone, benzoin, 2-hydroxy-2-methyl-1-phenylpropan-1-one, 2,2-dimethoxy-1,2-diphenylethan-1-one, 1-hydroxy cyclohexyl phenyl ketone, and 2,4,6-trimethylbenzoyl diphenyl phosphine oxide, and a mixture thereof. Preferably, the photoinitiator is benzophenone or 1-hydroxy cyclohexyl phenyl ketone.

The fluorescent whitening agent suitable for the present invention is not particularly limited, and can be any fluorescent whitening agent well known to persons having ordinary skill in the art, which can be an organic, including, for example, but being not limited to, a benzoxazole, a benzimidazole, or a diphenylethylene bistriazine; or an inorganic, including, for example, but being not limited to, zinc sulfide.

The UV absorber suitable for the present invention can be any UV absorber well known to persons having ordinary skill in the art, for example, a benzotriazole, a benzotriazine, a benzophenone, or a salicylic acid derivative.

Moreover, when the substrate is a plastic substrate, to prevent the plastic substrate from yellowing, inorganic particulates capable of absorbing UV light can be optionally added to the hard coat solutions. The inorganic particulates can be, for example, but are not limited to, zinc oxide, strontium titanate, zirconia, alumina, titanium dioxide, calcium sulphate, barium sulfate, or calcium carbonate, or a mixture thereof, of which titanium dioxide, zirconia, alumina, zinc oxide, or a mixture thereof is preferred. The particle size of the above-mentioned inorganic particulates is typically in the range from about 1 nanometer (nm) to about 100 nm, preferably from about 20 nm to about 50 nm.

In order to achieve a light diffusion effect, the first hard coat layer on the first surface 15 of the substrate 12 has a convex-concave structure and serves as a diffusion layer 13. The method for forming the diffusion layer is not particularly limited, and can be any method that is well known to persons skilled in the art, which includes, for example, but is not limited to, screen printing, coating, spray coating, or embossing processing, and the like. According to the present invention, the diffusion layer 13 is formed by coating a first hard coat layer 13 having a convex-concave structure and containing organic particles 14 on the first surface 15 of the substrate 12. In order to allow the light to transmit, the diffusion layer is preferably colorless and transparent, and the thickness of the diffusion layer is in the range of about 2 µm to about 20 µm, preferably in the range of about 5 µm to about 10 µm.

According to the present invention, the shape of the organic particles 14 contained in the diffusion layer 13 is not particularly limited, and can be, for example, spherical or elliptic or irregular shapes, of which the spherical shape is preferred. The organic particles have a single mean particle size ranging from about 2 µm to about 20 µm, preferably from about 5 µm to about 10 µm. More preferably, the organic particles have a mean particle size of about 5, 8, and 10 µm. The organic particles provide a light scattering effect. In order to enhance the luminance of the scratch-resistant optical film, the organic particles used in the present invention have a highly uniform particle size. By the term "highly uniform particle size," it refers to the organic particles that have a particle size distribution ranging within about ±5%, and preferably ranging within about ±4% of the mean particle size of the particles. For example, if the organic particles having a mean particle size of about 10 µm are used, the particle size distribution of the organic particles in the diffusion layer ranges within about 9.5 g/m to about 10.5 µm. Compared with the organic particles having a mean particle size of about 15 g/m and a particle size distribution within about 1 µm to about 30 g/m used in the prior art, the organic particles used in the present invention not only have a single mean particle size, but the particle size distribution is relatively narrow, so the present invention can avoid wastes of the light source caused by an excessively large light scattering range due to the significant difference in the particle size of the organic particles, thereby enhancing the luminance of the optical film.

The distribution of the organic particles in the diffusion layer according to the present invention is not particularly limited, and preferably, as shown in FIG. 2, the organic particles are uniformly distributed in a single layer. The single-layer uniform distribution can not only reduce the raw material cost, but also reduce the wastes of the light source, thus enhancing the luminance of the optical film. The organic particles are used in an amount from about 0.1 parts by weight to about 28 parts by weight per 100 parts by weight of the solids content of the hard coat solution for forming the first hard coat layer.

The organic particles used in the present invention are formed from a polyacrylate resin which comprises at least one mono-functional acrylate monomer and at least one multi-functional acrylate monomer as the polymerization units, wherein the multi-functional acrylate monomers are present in an amount from 30 to 70 wt % based on the total weight of the monomers used. According to the present invention, at least one multi-functional monomer is used, such that the monomers undergo crosslinking reaction with each other, and the crosslinking degree of the obtained organic particles can be enhanced. Therefore, the hardness of the organic particles is enhanced so as to enhance the scratch resistance and wear resistance properties of the organic particles, and to improve the solvent resistance property of the particles.

The mono-functional acrylate monomer suitable for the present invention is selected from, but not limited to, the group consisting of methyl methacrylate (MMA), butyl methacrylate, 2-phenoxy ethyl acrylate, ethoxylated 2-phenoxy ethyl acrylate, 2-(2-ethoxyethoxy)ethyl acrylate, cyclic trimethylolpropane formal acrylate, β-carboxyethyl acrylate, lauryl methacrylate, isooctyl acrylate, stearyl methacrylate, isodecyl acrylate, isobornyl methacrylate, benzyl acrylate, 2-hydroxyethyl methacrylate phosphate, hydroxyethyl acrylate (HEA), and 2-hydroxyethyl methacrylate (HEMA), and a mixture thereof.

The multi-functional acrylate monomer suitable for the present invention is selected from, but not limited to, the group consisting of hydroxypivalyl hydroxypivalate diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate (EGDMA), diethylene glycol dimethacrylate, tris(2-hydroxy ethyl)isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, ditrimethylolpropane tetraacrylate, propoxylated pentaerythritol tetraacrylate, pentaerythritol tetraacrylate, dipentaerythritol hexaacrylate, tripropylene glycol dimethacrylate, 1,4-butanediol dimethacrylate, 1,6-hexanediol dimethacrylate, allylated cyclohexyl dimethacrylate, isocyanurate dimethacrylate, ethoxylated trimethylol propane trimethacrylate, propoxylated glycerol trimethacrylate, trimethylol propane trimethacrylate, and tris(acryloxyethyl)isocyanurate, and a mixture thereof.

According to a preferred embodiment of the present invention, the organic particles 14 contained in the diffusion layer are polyacrylate resin particles formed from the monomers containing methyl methacrylate and ethylene glycol dimethacrylate, wherein the weight ratio of the methyl methacrylate monomer to the ethylene glycol dimethacrylate monomer can be 70:30, 60:40, 50:50, 40:60 or 30:70. When the amount of the ethylene glycol dimethacrylate monomer is about 30 wt % to about 70 wt % based on the total weight of the monomers, a preferable crosslinking degree can be obtained.

According to another embodiment of the present invention, when the hard coat solution for forming the first hard coat layer contains a curing agent, the organic particles 14 may further contain a carboxy group (—COOH), a hydroxyl group (—OH), or an amino group (—NH$_2$), so as to improve the adhesion between the particles 14 and the curing agent in the hard coat solution for forming the first hard coat layer. For example, the organic particles can be prepared from the monomers containing 2-hydroxyethyl methacrylate (HEMA), or a methacrylate monomer.

In order to prevent the scratch-resistant optical film of the present invention from being scratched by other films, the second surface 16 of the substrate 12 of the invention is coated with a second hard coat layer as a scratch-resistant layer 11 that has a smooth surface. Said scratch-resistant layer 11 has a thickness in the range from about 1 μm to about 10 μm, preferably from about 3 μm to about 6 μm.

The diffusion layer or scratch-resistant layers of the scratch-resistant optical films according to the invention can be manufactured according to any method well known to those skilled in the art, which for example can be a method comprising the following steps:

(I) Mixing a UV curable resin; at least one resin selected from a thermal setting resin, a thermal plastic resin, and a mixture thereof; organic particles; a solvent; and an anti-static agent, and optionally a conventional additive, to provide a colloidal hard coat solution;

(II) Coating the hard coat solution onto a surface of a substrate to provide a coating;

(III) Putting the coated substrate into an oven to evaporate the solvent, and heating the substrate for several minutes at an elevated temperature above the curing point of the thermal setting resin to perform a thermal setting polymerization; and (IV) Irradiating the coating with an energetic ray to initiate photo polymerization to provide a hard coat layer, wherein the intensity of the energetic ray is in the range from about 100 to about 1000 mJ/cm$^2$, preferably from about 200 to about 800 mJ/cm$^2$.

If desired, the above-described steps can be repeated to afford a plurality of hard coat layers.

The scratch-resistant optical film according to the invention has a good light transmittance, i.e., a transmittance in the range from about 70% to about 95% as measured according to JIS K7136 standard method. Furthermore, to obscure the prismatic stripes of the brightness enhancing film, the scratch-resistant optical film according to the invention, to some extent, diffuses the light, and has a haze of about 8% to about 97%, preferably about 30% to about 75%, as measured according to JIS K7136 standard method. In addition, the first and second hard coat layers of the scratch-resistant optical film have a surface resistivity in the range from $10^8$ to $10^{12}$Ω/□ (square) and a pencil hardness of 3H or more as measured according to JIS K5400 standard method.

Figure 3:
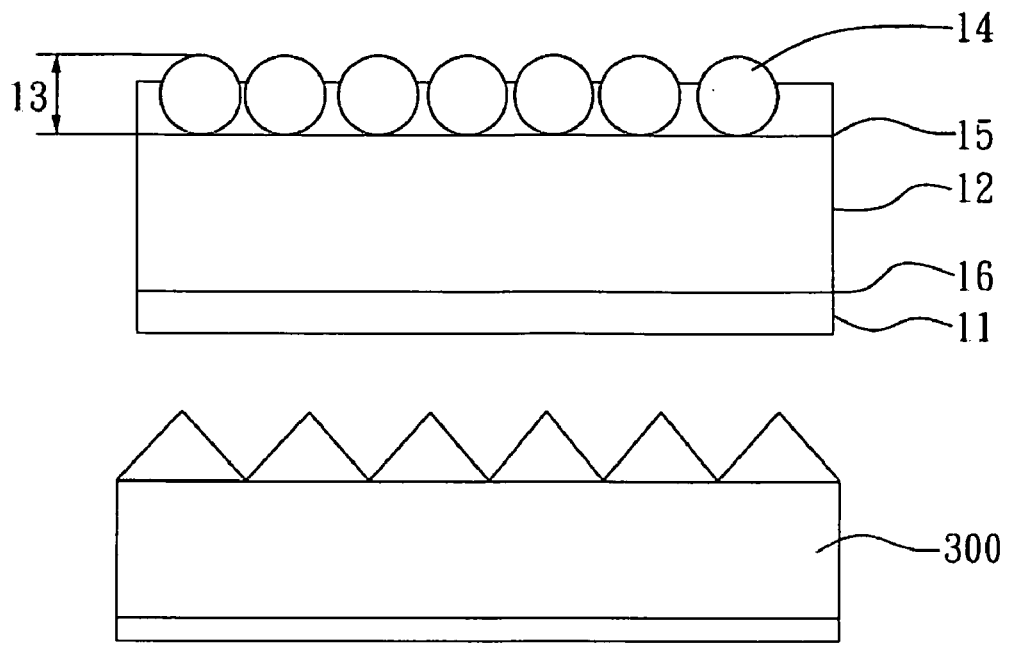
FIG. 3 is a schematic view of the scratch-resistant optical film according to the present invention in combination with a brightness enhancement film.

The scratch-resistant optical film of the invention can be used in backlight modules with a brightness enhancement film and positioned above the light emitting surface of the brightness enhancement film. As shown in FIG. 3, a scratch-resistant optical film as shown in FIG. 2 is laminated on a brightness enhancement film 300. The scratch-resistant optical film according to the invention possesses a hard coat layer formed from the hard coat solution according to the present invention on a surface of the substrate. The hard coat layer can effectively enhance the hardness of the optical film and protect the contact means, and also provide a smooth surface without warp, thereby avoiding the optical properties to be affected. Furthermore, since the surface of the substrate has a coating with a convex-concave structure, the scratch-resistant optical film according to the invention also possesses diffusion function. In addition, since the organic particles in the layer have a uniform particle size, the waste of a portion of the light source can be reduced and the luminance of the optical film can be enhanced. Therefore, the optical film of the present invention can be used as a protective diffusion film in a backlight module of a display.

In addition, in various optical films, the brightness enhancement film is relatively expensive, so in the newly developed backlight module structures, modifications were made to the other optical films and the combinations thereof so as to substitute for the brightness enhancement film and to reduce the cost. For example, in liquid crystal displays, two or three diffusion films were used to replace the conventional design of the brightness enhancement film with two diffusion films respectively located on and below the brightness enhancement film.

Figure 4:
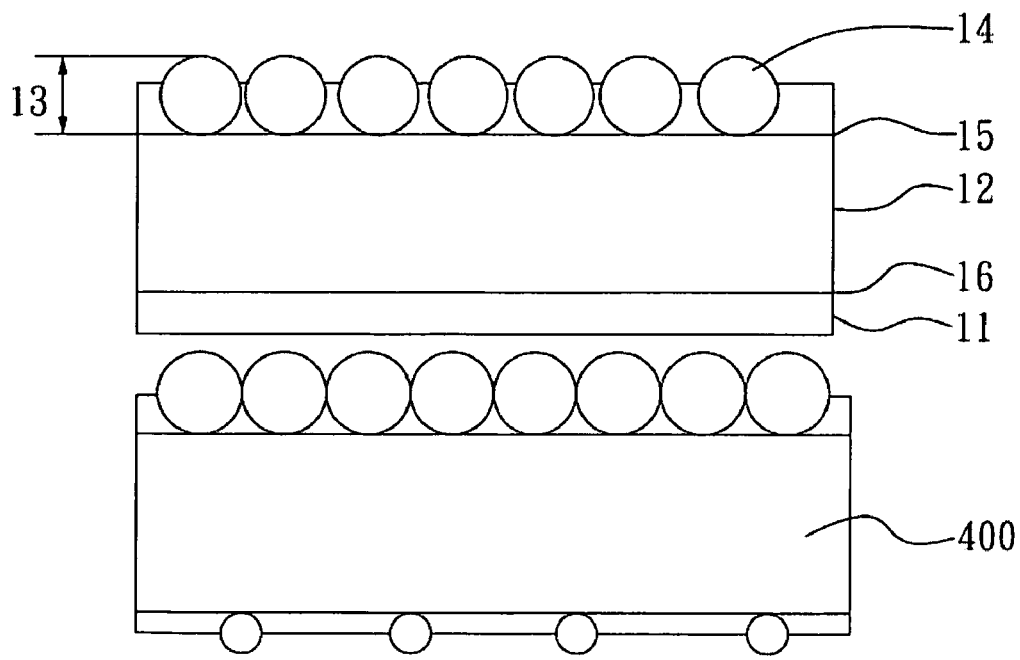
FIG. 4 is a schematic view of the scratch-resistant optical film according to the present invention in combination with a lower diffusion film.

Since the scratch-resistant optical film of the invention exhibits both light diffusion function and excellent luminance, as shown in FIG. 4, a scratch-resistant optical film of the invention as shown in FIG. 2 can be directly laminated on a lower diffuser 400 as a substitute for the conventional design having a brightness enhancement film in combination with other diffusers.

The following examples are used to further illustrate the present invention, but not intended to limit the scope of the present invention. Any modifications or alterations that can easily be accomplished by persons skilled in the art fall within the scope of the disclosure of the specification and the appended claims.

PREPARATION EXAMPLE 1

Formulating a UV curable resin formulation A: In a 250 mL glass bottle, 40 g toluene was added. With high speed stirring, the following substances were added in sequence: 10 g dipentaerythritol hexaacrylate, 2 g trimethylol propane trimethacrylate, 14 g pentaerythritol triacrylate, an oligomer: 30 g of an aliphatic urethane hexaacrylate [Etercure 6415-100, Eternal Co.], and a photoinitiator: 4 g 1-hydroxy cyclohexyl phenyl ketone to provide 100 g of a UV curable resin formulation A with a solids content of about 60%.

PREPARATION EXAMPLE 2

Formulating a UV curable resin formulation B: In a 250 mL glass bottle, 34 g toluene and 6 g butanone were added. With high speed stirring, the following substances were added in sequence: 16 g dipentaerythritol hexaacrylate, 2 g trimethylol propane trimethacrylate, 20 g pentaerythritol triacrylate, an oligomer: 18 g of an aliphatic urethane hexaacrylate [Etercure 6112-100, Eternal Co.], and a photoinitiator: 4 g 1-hydroxy cyclohexyl phenyl ketone to provide 100 g of a UV curable resin formulation B with a solids content of about 60%.

PREPARATION EXAMPLE 3

First Hard Coat Layer

Diffusion Layer

To a 250 ml glass bottle, 24 g toluene and 8 g butanone were added as a solvent. With high speed stirring, the following substances were added in sequence: 4 g acrylic particles with an average particle size of 8 μm [SSX-108, SEKISUI PLASTICS Co.; highly crosslinked organic particles produced from 50:50 methyl methacrylate and ethylene glycol dimethacrylate and having a particle size of 8 μm±5%]; 40 g of the UV curable resin formulation A prepared in Preparation Example 1 (with a solids content of about 60%, Eternal Company); a thermal setting resin: 20 g of polymethacrylic polyol resin [Eterac 7361-ts-50, Eternal Company] (with a solids content of about 50%); 2 g of a curing agent [Desmodur 3390, Bayer Co.] (with a solids content of about 75%); and 2 g of an anti-static agent [GMB-36M-AS, Marubishi Oil Chem. Co., Ltd] (with a solids content of about 20%) to prepare a coating material with a total weight of about 100 g and solids content of about 40%. The coating material was coated on a PET substrate of 188 μm in thickness [U34, TORAY Co.] with a RDS Bar Coater #6, dried at 110° C. for 1 minute, then dried by being exposed in a UV exposure machine [Fusion UV, F600V, 600 W/inch, H type lamp source] at a power set at 100% and at a speed of 15 m/min with an energetic ray of 200 mJ/cm$^2$, to afford a first hard coat layer (a diffusion layer) with a coating thickness of about 8 μm.

PREPARATION EXAMPLE 4

First Hard Coat Layer

Diffusion Layer

To a 250 ml glass bottle, 24 g toluene and 8 g butanone were added as a solvent. With high speed stirring, the following substances were added in sequence: 6 g acrylic particles with an average particle size of 8 μm [SSX-108, SEKISUI PLASTICS Co.; highly crosslinked organic particles produced from 50:50 methyl methacrylate and ethylene glycol dimethacrylate and having a particle size of 8 μm±5%]; 40 g of the UV curable resin formulation A prepared in Preparation Example 1 (with a solids content of about 60%, Eternal Company); a thermal setting resin: 20 g of polymethacrylic polyol resin [Eterac 7361-ts-50, Eternal Company] (with a solids content of about 50%); 2 g of a curing agent [Desmodur 3390, Bayer Co.] (with a solids content of about 75%); and 2 g of an anti-static agent [GMB-36M-AS, Marubishi Oil Chem. Co., Ltd] (with a solids content of about 20%) to prepare a coating material with a total weight of about 102 g and solids content of about 40%. The coating material was coated on a PET substrate of 188 μm in thickness [U34, TORAY Co.] with a RDS Bar Coater #6, dried at 110° C. for 1 minute, then dried by being exposed in a UV exposure machine [Fusion UV, F600V, 600 W/inch, H type lamp source] at a power set at 100% and at a speed of 15 m/min with an energetic ray of 200 mJ/cm$^2$, to afford a first hard coat layer (a diffusion layer) with a coating thickness of about 8 μm.

PREPARATION EXAMPLE 5

First Hard Coat Layer

Diffusion Layer

To a 250 ml glass bottle, 24 g toluene and 8 g butanone were added as a solvent. With high speed stirring, the following substances were added in sequence: 10 g acrylic particles with an average particle size of 10 μm [SSX-108, SEKISUI PLASTICS Co.; highly crosslinked organic particles produced from 50:50 methyl methacrylate and ethylene glycol dimethacrylate and having a particle size of 10 μm±5%]; 40 g of the UV curable resin formulation A prepared in Preparation Example 1 (with a solids content of about 60%, Eternal Company); a thermal setting resin: 20 g of polymethacrylic polyol resin [Eterac 7361-ts-50, Eternal Company] (with a solids content of about 50%); 2 g of a curing agent [Desmodur 3390, Bayer Co.] (with a solids content of about 75%); and 2 g of an anti-static agent [GMB-36M-AS, Marubishi Oil Chem. Co., Ltd] (with a solids content of about 20%) to prepare a coating material with a total weight of about 106 g and solids content of about 40%. The coating material was coated on a PET substrate of 188 μm in thickness [U34, TORAY Co.] with a RDS Bar Coater #6, dried at 110° C. for 1 minute, then dried by being exposed in a UV exposure machine [Fusion UV, F600V, 600 W/inch, H type lamp source] at a power set at 100% and at a speed of 15 m/min with an energetic ray of 200 mJ/cm$^2$, to afford a first hard coat layer (a diffusion layer) with a coating thickness of about 8 μm.

EXAMPLES 1, 2, AND 3

Second Hard Coat Layer

Scratch-Resistant Layer

To a 250 ml glass bottle, 26 g butanone was added as a solvent. With high speed stirring, a UV curable resin: 26 g of the UV curable resin formulation B prepared in Preparation Example 2 (with a solids content of about 60%, Eternal Company); a thermal setting resin: 26 g of polymethacrylic polyol resin [Eterac 7365-s-30, Eternal Company] (with a solids content of about 30%); 2 g of a curing agent [Desmodur 3390, Bayer Co.] (with a solids content of about 75%); and 2 g of an anti-static agent [GMB-36M-AS, Marubishi Oil Chem. Co., Ltd] (with a solids content of about 20%) to prepare a coating material with a total weight of about 80 g and solids content of about 30%. The coating material was coated onto the other surface of each of the PET substrates coated with a first hard coat layer as prepared in Preparation Examples 3, 4, and 5 with a RDS Bar Coater #6, dried at 110° C. for 1 minute, then dried by being exposed in a UV exposure machine [Fusion UV, F600V, 600 W/inch, H type lamp source] at a power set at 100% and at a speed of 15 m/min with an energetic ray of 200 mJ/cm$^2$, to afford second hard coat layers (scratch-resistant layers) respectively having a coating thickness of about 6 μm. The resultant scratch-resistant optical films of Examples 1, 2, and 3, each with an overall film thickness of 202 μm, 202 μm, and 202 μm, were tested for various properties, and the results obtained are shown in Table 1 below.

COMPARATIVE EXAMPLE 1

A commercially available protective diffusion film with a thickness of 200 μm and having organic particles with a particle size distribution from 1 to 10 μm in the diffusion layer on the substrate surface [PBS632L, Keiwa Co.] was tested for various properties, and the results obtained are shown in Table 1 below.

COMPARATIVE EXAMPLE 2

A commercially available protective diffusion film with a thickness of 200 μm and having polymethyl methacrylate particles with a particle size distribution from 1 to 20 μm in the diffusion layer on the substrate surface [D117VGZ, Tsujiden Co.] was tested for various properties, and the results obtained are shown in Table 1 below.

COMPARATIVE EXAMPLE 3

A commercially available protective diffusion film with a thickness of 205 μm and having polymethyl methacrylate particles with a particle size distribution from 1 to 20 μm in the diffusion layer on the substrate surface [JS-153R, SKC Co.] was tested for various properties, and the results obtained are shown in Table 1 below.

Test Method A:

Film Thickness Test: The thicknesses of the films of Examples 1 to 3 and Comparative Examples 1 to 3 were measured with a coating thickness gauge (PIM-100, TESA Corporation) under 1 N pressing contact. The results were recorded above.

Testing Method B:

Haze and Total Transmittance Test: According to JIS K7136 standard method, the test samples were measured for a haze (Hz) and total transmittance (Tt) with a NDH 5000W Haze Meter (Nippon Denshoku Industries Co., Ltd.). The results are listed in Table 1 below.

Pencil Hardness Test: According to JIS K-5400 method, the test samples were tested with a Pencil Hardness Tester [Elcometer 3086, SCRATCH BOY], using Mitsubishi pencil (2H, 3H). The results of the test are shown in Table 1 below.

Surface Resistivity Test: The surface resistivity of the samples was measured with a Superinsulation Meter [EASTASIA TOADKK Co., SM8220&SME-8310, 500 V]. The testing conditions were: 23±2° C., 55±5% RH. The results of the test are shown in Table 1 below.

Wear Resistance Test: A Linear Abraser [TABER 5750] was used, and a 3M BEF-III-10T film (20 mm length×20 mm width) to be tested was affixed on a 600 g platform (area: 20 mm length×20 mm width). The prism structure layer of the film faces upwards, so as to test the wear resistance under high pressure of the scratch-resistance layers of films under the test. The wear resistance test was performed in 10 cycles with a test path of 2 inches and a speed of 10 cycles/min. The results of the test are listed in Table 1 below.

Warp Test: The test films were cut into level films with 100 mm length×100 mm width, placed in an oven at 120° C. for 10 min, and then taken out and left at room temperature. After being cooled down to the room temperature, the films were measured for warping level on the four corners with a gap gauge (recording unit: millimeter (mm), recording manner: for example, 0; 0; 0; 0), and thereby, the test samples were evaluated for heat resistance and warp resistance properties. The results of the test are listed in Table 1 below.

TABLE 1

|  | Example 1 | Example 2 | Example 3 | Comparative Example 1 | Comparative Example 2 | Comparative Example 3 |
| --- | --- | --- | --- | --- | --- | --- |
| Haze, Hz (%) | 36.30 | 50.35 | 71.30 | 34.20 | 45.71 | 61.44 |
| Total Light Transmittance, Tt (%) | 90.50 | 91.56 | 92.40 | 89.85 | 91.18 | 93.00 |
| Pencil Hardness (the first diffusion layer) | 3H | 3H | 3H | 2H | 2H | 2H |

TABLE 1-continued

|  | Example 1 | Example 2 | Example 3 | Comparative Example 1 | Comparative Example 2 | Comparative Example 3 |
|---|---|---|---|---|---|---|
| Pencil Hardness (the second diffusion layer) | 3H | 3H | 3H | 2H | 3H | 2H |
| Surface Resistivity $\Omega/\square$ (the first diffusion layer) | $6.5 \times 10^{11}$ | $3.8 \times 10^{11}$ | $4.7 \times 10^{11}$ | $7.4 \times 10^{12}$ | $2.3 \times 10^{11}$ | $6.3 \times 10^{16}$ |
| Surface Resistivity $\Omega/\square$ (the second diffusion layer) | $7.3 \times 10^{10}$ | $6.5 \times 10^{10}$ | $4.7 \times 10^{10}$ | $1.3 \times 10^{12}$ | $1.8 \times 10^{12}$ | $2.6 \times 10^{13}$ |
| Wear Resistance Test of Diffusion Layer | No Scratch | No Scratch | No Scratch | Severe Scratch | No Scratch | Severe Scratch |
| Warp Test (mm) (120° C., 10 min) | 0; 0; 0; 0 | 0; 0; 0; 0 | 0; 0; 0; 0 | 0.1; 0.1; 0.1; 0.1 | 0.1; 0.1; 0.1; 0.1 | 0.2; 0.2; 0.2; 0.2 |

According to Table 1, the results of the examples and the comparative examples show that the scratch-resistant optical films of the present invention have desirable anti-static property and high hardness property and have preferred surface evenness without warping, thus preventing the optical properties from being affected.

Testing Method C:

The films of Examples 1 to 3 and Comparative Examples 1 to 3, and the diffusion film [DI-780A] and brightness enhancement film [PF-96S-188] produced by Eternal Company are assembled with a backlight source to form various modules for luminance evaluation.

Original Backlight Source: based on a 22" side-type backlight source, constructed by disposing one diffusion film on a light guide plate, arranging two cold cathode fluorescent lamps (CCFLs) and a lamp reflector on each side of the light guide plate, and placing one diffusion film (DI-780A) and one brightness enhancement film (PF-96S-188) on the light guide plate.

Luminance Measurement Method: Central luminance (cd/m²) and 13-point luminance of the backlight source and the modules were measured with a luminance meter, 2° angle [Topcon Company, SC-777] at a distance of 50 cm and normal direction (i.e., at an angle of 0°) from the backlight source. The 13-point luminance uniformity was calculated in the following manner: the minimum luminance value obtained from the 13-point luminance tests was divided by the maximum luminance value and then multiplied by 100% (namely, minimum luminance value/maximum luminance value×100%). The results were listed in Tables 2 and 3.

TABLE 2

| 22" Side-type Backlight Source | Central Luminance (cd/m²) | 13-point Luminance Uniformity (%) |
|---|---|---|
| Original Backlight Source | 6,480 | 85.0 |
| Original Backlight Source + one film of Example 1 | 6,350 | 86.3 |
| Original Backlight Source + one film of Example 2 | 6,286 | 86.5 |
| Original Backlight Source + one film of Example 3 | 6,250 | 86.8 |
| Original Backlight Source + one film of Comparative Example 1 | 6,220 | 85.8 |
| Original Backlight Source + one film of Comparative Example 2 | 6,156 | 86.0 |
| Original Backlight Source + one film of Comparative Example 3 | 5,962 | 86.2 |

It can be seen from Table 2 that the original 22" side-type backlight source has a central luminance of 6,480 cd/m², and if one film of Examples 1, 2, and 3 is additionally used, the resultant central luminance values are respectively 6,350 cd/m², 6,286 cd/m², and 6,250 cd/m²; if one film of Comparative Examples 1, 2, and 3 is additionally used, the resultant central luminance values are respectively 6,220 cd/m², 6,156 cd/m², and 5,962 cd/m². Clearly, compared with the films of Comparative Examples 1 to 3, the films of Examples 1 to 3 of the present invention impart the original backlight source with a better luminance. Moreover, the data in Table 2 clearly show that the films of Examples 1 to 3 of the present invention achieve a better 13-point luminance uniformity. Therefore, the optical films of the present invention is applicable for the backlight modules of LCDs and notebooks, and can effectively diffuse the light and provide desirable luminance, so that they can be used as a substitute for a conventional design.

What is claimed is:

1. A scratch-resistant optical film, comprising:
   (a) a transparent substrate having a first surface and a second surface;
   (b) a diffusion layer on the first surface of the substrate, which has a convex-concave structure and is comprised of a first hard coat layer containing organic particles; and
   (c) a scratch-resistant layer on the second surface of the substrate that has a smooth surface and is comprised of a second hard coat layer,
   wherein the organic particles in the first hard coat layer are formed from a polyacrylate resin which comprises at least one mono-functional acrylate monomer and at least one multi-functional acrylate monomer as polymerization units, said multi-functional acrylate monomer(s) being in an amount from 30 to 70 wt % based on the total weight of the monomers used, and wherein the organic particles have a single mean particle size and have a particle size distribution in the range within about ±5% of the mean particle size.

2. The scratch-resistant optical film as claimed in claim 1, wherein the first and second hard coat layers are formed from hard coat solutions treated in a manner of dual curing with both heat and UV radiation, and the hard coat solutions for forming the first and second hard coat layers can be the same or different and independently comprise an anti-static agent, a UV curable resin, and a resin selected from the group consisting of a thermal setting resin and a thermal plastic resin and a mixture thereof.

3. The scratch-resistant optical film as claimed in claim 1, wherein the organic particles are used in an amount from about 0.1 parts by weight to about 28 parts by weight per 100 parts by weight of the solids content of the hard coat solution for forming the first hard coat layer.

4. The scratch-resistant optical film as claimed in claim 1, wherein the organic particles have a particle size distribution ranging within about ±4% of the mean particle size of the particles.

5. The scratch-resistant optical film as claimed in claim 1, wherein the organic particles have a mean particle size in a range from about 2 μm to about 20 μm.

6. The scratch-resistant optical film as claimed in claim 1, wherein the mono-functional acrylate monomer is selected from the group consisting of methyl methacrylate, butyl methacrylate, 2-phenoxy ethyl acrylate, ethoxylated 2-phenoxy ethyl acrylate, 2-(2-ethoxyethoxy)ethyl acrylate, cyclic trimethylolpropane formal acrylate, β-carboxyethyl acrylate, lauryl methacrylate, isooctyl acrylate, stearyl methacrylate, isodecyl acrylate, isobornyl methacrylate, benzyl acrylate, 2-hydroxyethyl methacrylate phosphate, methacrylate, hydroxyethyl acrylate, and 2-hydroxyethyl methacrylate, and a mixture thereof.

7. The scratch-resistant optical film as claimed in claim 1, wherein the multi-functional acrylate monomer is selected from the group consisting of hydroxypivalyl hydroxypivalate diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate, diethylene glycol dimethacrylate, tris(2-hydroxy ethyl)isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, ditrimethylolpropane tetraacrylate, propoxylated pentaerythritol tetraacrylate, pentaerythritol tetraacrylate, dipentaerythritol hexaacrylate, tripropylene glycol di-methacrylate, 1,4-butanediol dimethacrylate, 1,6-hexanediol dimethacrylate, allylated cyclohexyl dimethacrylate, isocyanurate dimethacrylate, ethoxylated trimethylol propane tri-methacrylate, propoxylated glycerol tri-methacrylate, trimethylol propane tri-methacrylate, and tris(acryloxyethyl) isocyanurate, and a mixture thereof.

8. The scratch-resistant optical film as claimed in claim 1, wherein the polyacrylate resin is formed from the monomers containing methyl methacrylate and ethylene glycol dimethacrylate.

9. The scratch-resistant optical film as claimed in claim 2, wherein the anti-static agent is selected from the group consisting of ethoxy glycerin fatty acid esters, quaternary amine compounds, aliphatic amine derivatives, polyethylene oxides, siloxanes, and alcohol derivatives.

10. The scratch-resistant optical film as claimed in claim 2, wherein the UV curable resin comprises at least one acrylate monomer having one or more functional groups.

11. The scratch-resistant optical film as claimed in claim 10, wherein the acrylate monomer is a methacrylate monomer, acrylate monomer, urethane acrylate monomer, polyester acrylate monomer, or epoxy acrylate monomer.

12. The scratch-resistant optical film as claimed in claim 10, wherein the UV curable resin further comprises an acrylate oligomer.

13. The scratch-resistant optical film as claimed in claim 2, wherein the thermal setting resin is selected from the group consisting of hydroxyl and/or carboxy group-containing polyester resins, epoxy resins, polyacrylate resins, polymethacrylate resins, polyamide resin, fluoro resins, polyimide resins, polyurethane resins, and alkyd resins, and a mixture thereof.

14. The scratch-resistant optical film as claimed in claim 2, wherein the thermal plastic resin is selected from the group consisting of a polyester resin and a polymethacrylate resin and a mixture thereof.

15. The scratch-resistant optical film as claimed in claim 2, wherein hard coat solutions for forming the first and second hard coat layers independently further comprise an additive selected from the group consisting of a curing agent, a photoinitiator, a fluorescent whitening agent, a UV absorber, a leveling agent, a wetting agent, a dispersant, a stabilizer, and inorganic particulates.

16. The scratch-resistant optical film as claimed in claim 15, wherein the curing agent is diisocyanate or polyisocyanate.

17. The scratch-resistant optical film as claimed in claim 1, wherein the transparent substrate is a glass substrate or plastic substrate.

18. The scratch-resistant optical film as claimed in claim 17, wherein the plastic substrate is selected from the group consisting of polyester resins, polyacrylate resins, polyimide resins, polystyrene resins, polycycloolefin resins, polyolefin resins, polycarbonate resins, polyurethane resins, triacetate cellulose (TAC), and a mixture thereof.

19. The scratch-resistant optical film as claimed in claim 18, wherein the plastic substrate is selected from the group consisting of polyethylene terephthalate, polymethyl methacrylate, polycycloolefin resin, and triacetate cellulose, and a mixture thereof.

20. The scratch-resistant optical film as claimed in claim 1, wherein the scratch-resistant layer has a thickness in the range from about 1 μm to about 10 μm.

21. The scratch-resistant optical film as claimed in claim 20, wherein the scratch-resistant layer has a thickness in the range from about 3 μm to about 6 μm.

22. The scratch-resistant optical film as claimed in claim 1, wherein the diffusion layer has a thickness in the range from about 2 μm to about 20 μm.

23. The scratch-resistant optical film as claimed in claim 22, wherein the diffusion layer has a thickness in the range from about 5 μm to about 10 μm.

24. The scratch-resistant optical film as claimed in claim 1, wherein the first and second hard coat layers have a surface resistivity in the range from $10^8$ to $10^{12}\Omega/\square$.

25. The scratch-resistant optical film as claimed in claim 1, wherein the first and second hard coat layers have a pencil hardness of 3H or more as measured according to JIS K5400 standard method.

26. The scratch-resistant optical film as claimed in claim 1, which has a haze of about 8% to about 97%, as measured according to JIS K7136 standard method.

27. The scratch-resistant optical film as claimed in claim 1, wherein the organic particles contained in the first hard coat layer have a single mean particle size ranging from about 5 μm to about 10 μm.

28. The scratch-resistant optical film as claimed in claim 1, wherein the organic particles are uniformly distributed in a single layer in the diffusion layer.

29. The scratch-resistant optical film as claimed in claim 1, for use as a protective diffusion film in a display device.

* * * * *